Jan. 3, 1928.  1,654,730
F. C. HOLTZ
MAXIMUM DEMAND METER
Filed Dec. 10, 1923  3 Sheets-Sheet 2
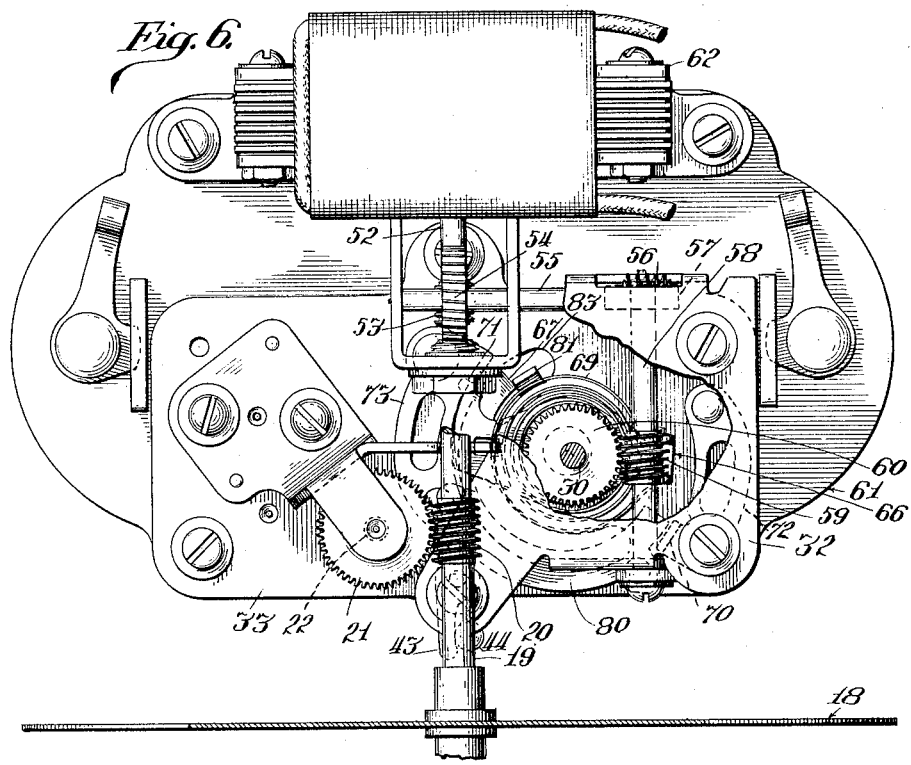
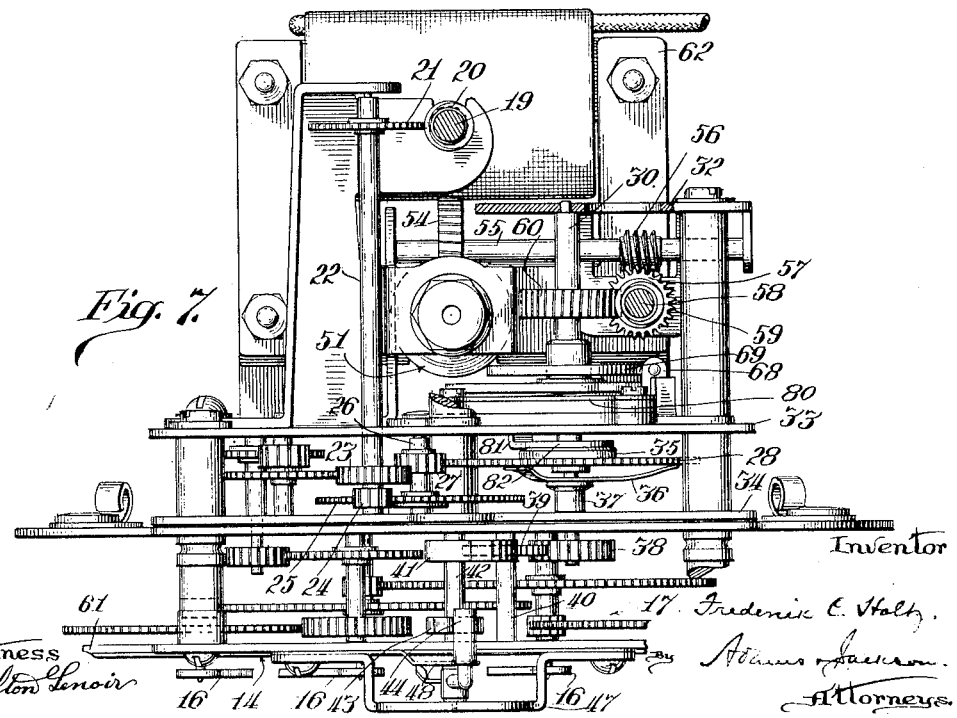

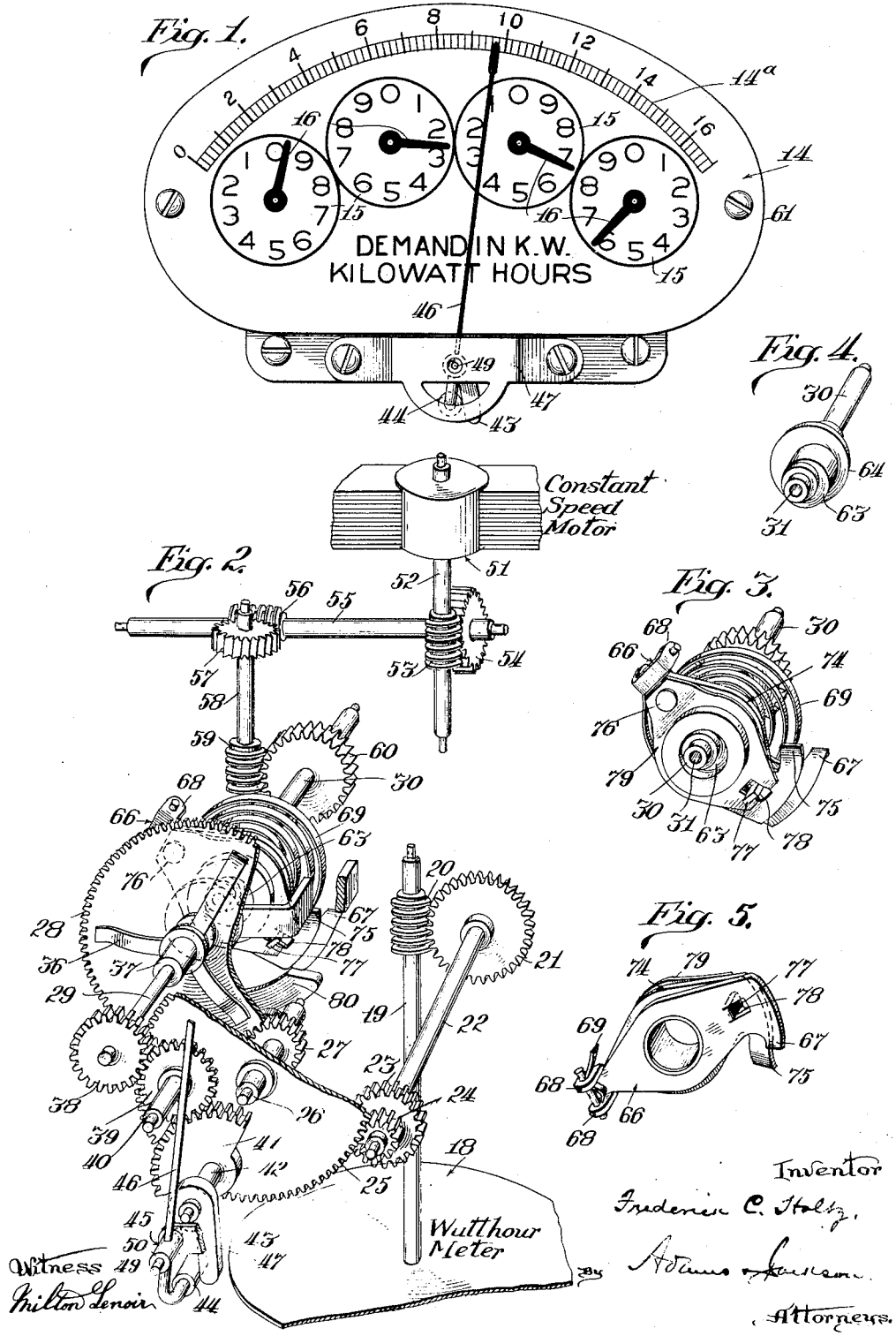

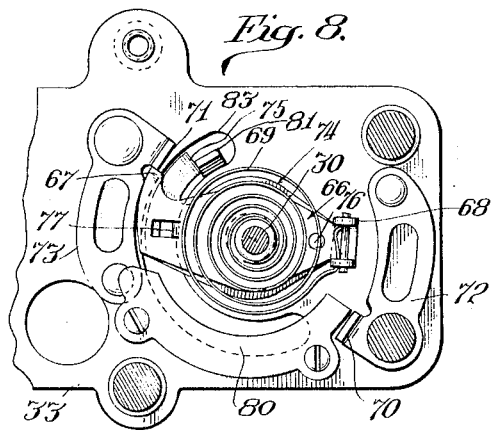
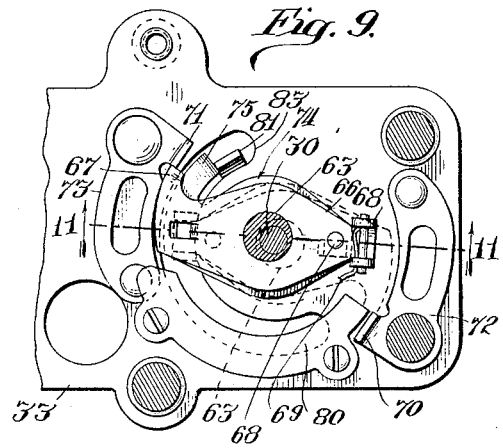
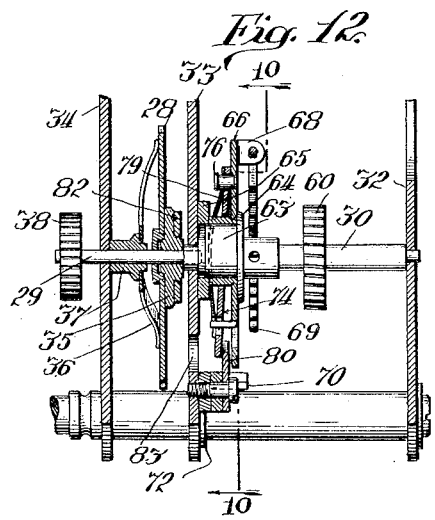
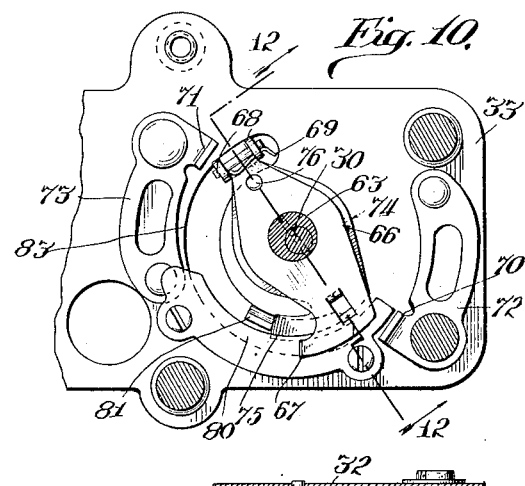
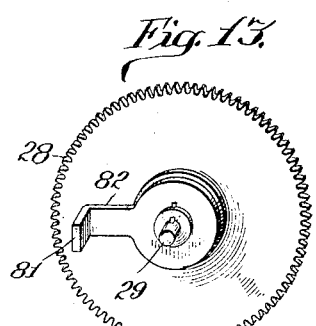
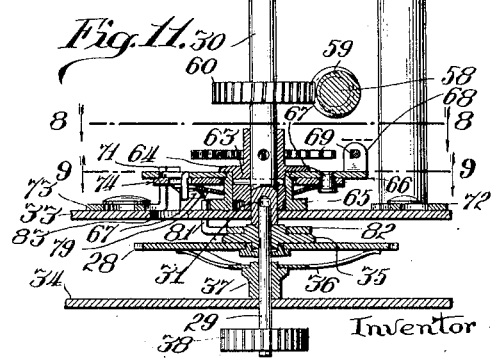

Patented Jan. 3, 1928.

1,654,730

UNITED STATES PATENT OFFICE.

FREDERICK C. HOLTZ, OF SPRINGFIELD, IILLINOIS, ASSIGNOR TO SANGAMO ELECTRIC COMPANY, OF SPRINGFIELD, ILLINOIS, A CORPORATION OF ILLINOIS.

MAXIMUM-DEMAND METER.

Application filed December 10, 1923. Serial No. 679,862.

My invention relates to electric meters, and has particularly to do with integrating meters equipped with auxiliary means for indicating the maximum power or energy consumption during any of a number of equal time intervals making up a predetermined accounting period. An instrument of this kind is shown and described in my Patent No. 1,619,473, granted March 1, 1927, and the object of my present invention is to provide a maximum demand indicating apparatus of the same general character as that shown in my said application, but embodying a number of changes by which the construction and operation of the apparatus are improved. I accomplish this object as hereinafter described in connection with the accompanying drawings, which illustrate one form in which my several improvements may be embodied. What I regard as new is set forth in the claims.

In the drawings,—

Fig. 1 is a front view of my improved attachment as it appears when ready for installation as a part of an integrating meter;

Fig. 2 is a perspective view illustrating schematically the general relation to each other of the principal parts of the apparatus;

Fig. 3 is a perspective view illustrating the devices by which the member which actuates the maximum demand indicator is reset at the expiration of each of the predetermined time intervals;

Fig. 4 is also a perspective view illustrating the shaft which is a component part of the device shown in Fig. 3;

Fig. 5 is a perspective view illustrating a resetting pawl and latch plate which also form a part of the device shown in Fig. 3, the view of these parts being, however, reversed;

Fig. 6 is a back view, as compared with Fig. 1, illustrating the assembled apparatus, showing also the armature shaft of the meter to which the attachment is applied;

Fig. 7 is a view of the attachment looking up from below, some parts being in section;

Fig. 8 is a partial section on line 8—8 of Fig. 11 illustrating a part of the resetting mechanism;

Fig. 9 is a similar view on line 9—9 of Fig. 11;

Fig. 10 is a section on line 10—10 of Fig. 12 showing a different position of the resetting pawl and latch plate from that shown in Figs. 8 and 9;

Fig. 11 is a section on line 11—11 of Fig. 9;

Fig. 12 is a section on line 12—12 of Fig. 10; and

Fig. 13 is a perspective view showing the resetting finger, and the gear by which said finger and the maximum demand indicator operating arm are actuated in a forward direction.

Maximum demand meters are usually provided with an indicating hand which during the first interval, which may be any suitable predetermined length of time, is advanced over a dial plate at a speed proportionate to that of the indicating mechanism of the integrating meter. The mechanism which actuates this maximum demand indicator is then automatically reset to its initial position while the indicator remains stationary at the point to which it has been advanced, unless during the next interval the consumption of energy should be greater, in which case the indicator would be correspondingly further advanced until the end of the second interval. This operation is repeated during the remainder of the accounting period, usually a month, and, therefore, obviously, the position of the maximum demand indicator at the end of the accounting period will show the greatest amount of energy consumed during any one of the predetermined periods. At the end of the month the meter reader resets the maximum demand indicator to its initial position and the apparatus then again operates as above described. It is, of course, necessary that in meters of this description the maximum demand indicator be operated correlatively with the integrating meter so that it will indicate correctly the amount of energy consumed during the time while it is being actuated, and it is also highly important that the devices for resetting the actuating mechanism for such indicator shall perform their work as nearly instantaneously as possible to avoid error in the energy consumption registered by said indicator. It is also necessary to so provide for actuating the several operating parts of the maximum demand indicator that they will not impose an appreciable burden upon or interfere with the operation of the integrating meter and thereby impair its accuracy. With this preliminary explanation of the general nature of the subject matter, I shall now proceed to a description of my improved apparatus as illustrated in the accompanying drawings.

The appearance of the maximum demand attachment viewed from the front is shown in Fig. 1, in which 14 indicates the usual dial plate on which are a series of dials 15, each of which is provided with a pointer 16. The several pointers are connected in series in the usual way, and are driven by clockwork, as indicated collectively by the reference numeral 17 in Fig. 7, so that from right to left they indicate consecutively units, tens, hundreds, etc. The clockwork 17 is driven by the rotating armature 18 shown in Fig. 6, which may be the armature of any watthour standard meter. In the illustrated construction this armature is carried by a shaft 19 provided with a worm 20 which meshes with a worm wheel 21, as shown in Figs. 6 and 7. The worm wheel 21 is mounted on a shaft 22, best shown in Fig. 7, which carries two pinions 23, 24, as shown in the latter figure and also in Fig. 2. The pinion 23 drives the clockwork 17, and therefore actuates the pointers or hands 16, while the pinion 24 actuates a driving train of gears through which the forward movement of the maximum demand indicator is effected. The latter train of gears is more clearly shown in Fig. 2, by reference to which it will be seen that the pinion 24 meshes with a gear 25 carried by a shaft 26 which also carries a pinion 27. The latter pinion meshes with a gear 28 that is rotatably mounted on a shaft 29, but is arranged to actuate the same through friction devices that will be hereinafter described. As best shown in Fig. 11, the shaft 29 is in axial alinement with a shaft 30, the inner end of which is provided with a socket 31 which receives and forms a bearing for the inner end of the shaft 29. The shaft 30 is journaled between pillar plates 32, 33, the inner end of said shaft extending through the latter pillar plate, and the outer end portion of the shaft 29 is journaled in a pillar plate 34, as shown in Fig. 11. The gear 28 is mounted on the shaft 29 between the pillar plates 33, 34, and between said gear and the adjacent end of the shaft 30 a disc 35 is mounted on and non-rotatably secured to the shaft 29, so that it has an extended surface bearing on the adjacent face of the gear 28 and is held against movement longitudinally of the axis of the shaft 29 by the end of the shaft 30 which abuts against it. At the opposite side of the gear 28 is a spring 36, preferably in the form of a spider, the central or hub portion of which bears against a sleeve 37 loosely mounted on the shaft 29, while the arms of said spring bear against the outer portion of the gear 28 and press it against the disc 35. The tension of the spring 36 is normally sufficient to cause said disc and the shaft 29 to rotate with the gear 28, although said shaft is capable of being rotated independently of said gear, which is the case during the resetting operation, as will be hereinafter explained. The purpose of rotating the shaft 29 by means of the gear 28 is to move the maximum demand indicator in a forward direction whenever the current consumption registered by the meter during any of the predetermined time intervals exceeds the maximum consumption during any preceding one of such time intervals. To this end the shaft 29 is operatively connected with an indicator actuating member by means of a pinion 38 mounted on and keyed to said shaft, best shown in Figs. 2 and 11, which pinion meshes with a pinion 39 mounted on a shaft 40, the latter shaft being mounted between the pillar plate 34 and a pillar plate 61 which forms a backing for the dial plate 14, as shown in Fig. 7. The pinion 39 also meshes with a segmental gear 41 mounted on a shaft 42 supported by the pillar plates 34 and 61, and provided with a crank arm 43, best shown in Figs. 1 and 2. This crank arm is arranged in operative relation to an arm 44 which is connected to and extends downward from a pivot 45 which carries the maximum demand indicator 46. The end portions of the pivot 45 are mounted in bearings, one of which is in a bracket 47 firmly secured to the pillar plate 61, and the other of which is in a spring plate 48 also attached to said pillar plate, as best shown in Fig. 7. The end portions of the pivot 45 are turned down to provide attenuated bearing members 49 and a shoulder 50 at the ends thereof, as best shown in Fig. 2, and the spring plate 48 in which the bearing member 49 at the inner end of said pivot is journaled exerts a light outward pressure against the shoulder at the inner end of said pivot, thereby pressing the corresponding shoulder at the outer end thereof against the inner face of the bracket 47. This provides sufficient friction to hold the maximum demand indicator in its different positions without, however, interfering with the movement of said indicator under the action of the crank 43. It will be evident that when these parts are in the position shown in Figs. 1 and 2, movement of the crank 43 in a clockwise direction will swing the indicator 46 to the right as viewed in said figures, but movement of said crank in the opposite direction will not affect said indicator. It may be explained at this time that the movement of the crank 43 in a clockwise direction is controlled by the current consumption measured by the meter, since as best shown in Fig. 2 the armature shaft 19 is connected with the gear 28 by the elements 20, 21, 22, 24, 25, 26 and 27, and the ensuing rotation of the gear 28 drives the crank 43 through the friction drive mechanism above described. Said crank is so moved in response to current consumption during each of the predetermined time intervals, and at the end of each of said intervals is moved back, or reset, to its initial position. It follows that when the meter is first put in service, at which time the crank 43 will be in its initial position and the arm 44 will be in contact with it, since the maximum demand indicator 46 will then be at the extreme left of the dial plate, as soon as the meter begins to register the crank arm 43 will begin to swing in a clockwise direction as viewed in Figs. 1 and 2, thereby moving the indicator 46 to the right as viewed in Fig. 1. At the end of the first time interval the crank 43 will be reset to its initial position, leaving the indicator 46 at the point on the face of the dial to which it has been moved. If, during the next time interval, the consumption of a greater amount of current is registered by the meter, the crank 43 will be moved a little farther to the left than it was before, and will therefore advance the indicator 46 correspondingly farther across the face of the dial, but if a less amount of current is consumed during the second interval the crank 43 will not be moved far enough to engage the arm 44, and consequently the position of the indicator 46 will not be changed. Obviously, therefore, the position of the indicator 46 will show the amount of current that was consumed during the time interval in which the greatest consumption of current occurred, or, in other words, the maximum demand during any of a given series of such time intervals. It will be understood, of course, that the train of gears by which the crank 43 is driven in a clockwise direction must be correlated with the meter, so that the movement of said crank will correspond with the current consumption as measured by the meter, and to the same end the movement of the maximum demand indicator 46 by said crank must be indicated by a suitably calibrated scale 14ª, shown in Fig. 1.

From what has been said, it will be manifest that the crank 43 must be driven in a forward or clockwise direction synchronously with the registering mechanism of the meter during each of the predetermined time intervals, say fifteen minutes, and that said crank must be reset to its initial position at the end of each of such intervals. It is also evident that the resetting must be practically instantaneous so that the sum of the successive forward movements of said crank will correspond with the integrated current consumption measured by the meter during any number of such time intervals, otherwise the position of the maximum demand indicator 46 would not necessarily accurately represent the maximum demand. Furthermore, as the gear 28 which drives the crank 43 in a forward direction is geared to the armature shaft 19 through the driving train described, it cannot rotate in a reverse direction, and therefore the resetting movement of the crank 43 must be independent of said gear 28. This is permitted by reason of the frictional driving connection comprising the disc 35, the gear 28 and the spring 36 already described.

Coming now to the resetting mechanism, it will be observed from an inspection of Fig. 2 that the shaft 30 is driven from a constant speed electric motor, indicated as a whole by the reference numeral 51, the armature shaft 52 of which carries a worm 53 which drives a worm wheel 54 carried by a countershaft 55. This countershaft also carries a worm 56 which drives a worm wheel 57 mounted on a shaft 58 provided with a worm 59. The latter worm drives a worm wheel 60 mounted on the shaft 30. The motor 51, therefore, drives the shaft 30 in a constant direction and at a constant speed. These parts are all mounted in a suitable frame which includes the several pillar plates 32, 33, 34 and 61 shown in Fig. 7. There is also a bracket 62 on which the motor 51 is mounted. The general arrangement of these parts is best shown in Figs. 6 and 7.

Mounted on the shaft 30 adjacent to the pillar plate 33 is an eccentric 63 in the form of a sleeve having a peripheral flange 64, as shown in Figs. 4 and 11, said eccentric being non-rotatably secured to the shaft 30 in any suitable way so that it rotates with said shaft. The eccentric 63 has a bearing in a sleeve 65 fitted between the flange 64 and the pillar plate 33, as best shown in Figs. 11 and 12, and carried by this sleeve, and preferably integral therewith, is a latch plate 66, the shape of which is best shown in Figs. 5 and 10, from which it will be seen that one end portion is provided with a dog 67 while the other end portion is provided with a clamp 68 for the attachment of a coiled spring 69 disposed around the rear end portion of the eccentric sleeve 63. The other end of this spring is fastened to the eccentric sleeve or to the shaft 30, so that rotation of the shaft 30 under the action of the constant speed motor 51 will tend to wind up said spring so long as the latch plate 66 is held against rotation. It is evident that when said latch plate is held against rotation, rotation of the shaft 30 will rotate the eccentric 63 within its bearing in the sleeve 65, and consequently will move the latch plate 66 endwise, or conversely, if the latch plate 66 be rotated independently of the eccentric 63, as it does at intervals under the action of the spring 69, as will be hereinafter more fully explained, said latch plate will be caused to move endwise by means of said eccentric. For temporarily holding the latch plate 66 against rotation at the proper times, two stops 70, 71 are provided at diametrically opposite sides of the axis of the shaft 30, these stops being carried respectively by plates 72, 73 secured to the pillar plate 33, as best shown in Figs. 9 and 10. The stops 70, 71 are so placed as to respectively intercept the dog 67 of the latch plate 66 when said latch plate is projected toward one or the other of them by the action of the eccentric 63, but to permit said dog to pass freely when said latch plate is retracted relatively to such stop. For example, when the parts are in the position shown in Fig. 9, at which time the dog 67 is projected to the left by the eccentric 63, it will engage the stop 71. The eccentric 63, however, is constantly rotated in a clockwise direction as viewed in Fig. 9 (counter-clockwise as viewed in Fig. 2) under the action of the constant speed motor 51, and consequently in due course the rotation of said eccentric will move the latch plate 66 endwise to the right, thereby releasing the dog 67 from the stop 71, whereupon the spring 69 will cause said latch plate to swing quickly in a clockwise direction (as viewed in Fig. 9) the movement being practically instantaneous. The movement of the eccentric 63 is comparatively very slow, and therefore as the latch plate swings around upon it the eccentric will project the latch plate in the opposite direction so that its dog 67 will then engage the stop 70, as indicated by dotted lines in Fig. 9. The latch plate 66 will therefore by arrested after it has made a half rotation about the eccentric and shaft 30. This movement will be repeated at the end of a given interval, thereby releasing the latch plate from the stop 70 and permitting it to return into engagement with the stop 71. Therefore, during half its cycle said latch plate will be arrested by the stop 71, and during the other half by the stop 70, its rotary movement between said stops being accomplished so quickly that it is practically instantaneous. The rotation of the eccentric 63 is timed so that it makes one complete rotation during each of the predetermined time intervals at the end of which the crank 43 is reset, and the resetting of said crank is accomplished during the movement of the latch plate 66 from the stop 70 to the stop 71, as will now be explained.

Mounted on the latch plate 66 between said plate and the pillar plate 33 is a resetting pawl 74 in the form of a plate generally similar in shape to the latch plate 66, but provided at its free end with a downturned tooth 75, as best shown in Figs. 3 and 5. At its opposite end the pawl 74 is connected with said latch plate adjacent to the clamp 68 by means of a rivet 76 or other suitable device, the connection being loose enough so that the opposite end of said pawl may move slightly toward and from said latch plate. Relative rotary movement of said plates is, however, prevented by means of a lug 77 carried by the latch plate 66 and extending down into a slot 78 formed in the free end of the pawl 74, as best shown in Fig. 3. The pawl 74 is provided with a central opening large enough to receive loosely the outer portion of the sleeve 65, and its free end is somewhat shorter than the corresponding end of the latch plate 66 so that the tooth 75 travels in a path concentric with the path of the dog 67, but of less diameter. While, therefore, said pawl moves with the latch plate 66 when the latter is moved endwise as above described, the pawl is never projected far enough to engage either of the stops 70, 71. A spring plate 79 corresponding in shape to the pawl 74 bears against said pawl, as shown in Fig. 3, and is also secured to the latch plate 66 by the rivet 76, and held against rotation by the lug 77. This spring tends to hold the pawl 74 yieldingly in contact with the latch plate 66 and parallel therewith, as shown in Fig. 11, but permits the free end of said pawl to be moved away from the latch plate, as shown in Fig. 12. This latter result is accomplished by means of what may be termed a wedge plate 80, since it performs the function of entering between the free end portion of the pawl 74 and the corresponding end of the latch plate 66 in the manner illustrated in Figs. 10 and 11, thereby separating said members and forcing the tooth 75 of the pawl 74 toward the adjacent surface of the pillar plate 33. The wedge plate 80 is segmental in form, as shown in Fig. 10, and it extends from the stop 70 through an arc of about 100° toward the stop 71, as shown in Figs. 8, 9 and 10. By this arrangement as soon as the latch plate 66 is released from the stop 70, the wedge plate 80 will enter between said latch plate and the pawl 74, thereby separating said members and moving the tooth 75 of the pawl toward the pillar plate 33 in the manner illustrated in Fig. 12. The purpose of this arrangement is to move said tooth at that time into position to engage a tooth 81 formed by the upturned end of an arm 82, see Figs. 11 and 13, which is fixedly secured to or formed integral with the disc 35, and through said disc is non-rotatably secured to the resetting shaft 29. The tooth 81 projects through a segmental slot 83 in the pillar plate 33 underlying the path of the tooth 75 from a point adjacent to the stop 70 to one a little beyond the stop 71, as shown in Figs. 8, 9 and 10. When the pawl 74 occupies a position close to and parallel with the latch plate 66, best shown in Fig. 11, its tooth 75 does not extend near enough to the pillar plate 33 to engage the tooth 81 of the arm 82, but when said pawl is tilted in the manner shown in Fig. 12, its tooth 75 is then moved toward said pillar plate far enough so that it will be intercepted by and will operatively engage the tooth 81, and so will cause said arm to rotate with said pawl and latch plate until they are arrested by the stop 71. When this occurs, the pawl will have cleared the opposite end of the wedge plate 80, and consequently will have sprung back into parallelism with the latch plate, thereby disengaging its tooth 75 from the tooth 81, so that the arm 82 will have been moved to the upper end of the slot 83 as viewed in Fig. 10, and the latch plate and pawl will be free to move through the next half of their cycle when released from the stop 71 without being interfered with by the tooth 81. The position of the tooth 81 in the upper end of the slot 83 corresponds with the initial position of the crank 43, since the arm 82 is moved in a counter-clockwise direction as viewed in Fig. 10, by the operation of the meter mechanism, this movement of the arm 82 resulting from the frictional engagement of the disc 35 with the gear 28. It is evident, therefore, that as the meter operates, the tooth 81 will be moved counter-clockwise in the slot 83 to an extent corresponding with the current consumption. At the end of each time interval, however, the release of the latch plate 66 from the stop 70 will cause the pawl 74 to engage the tooth 81 and carry it along with it until the latch plate 66 is arrested by the stop 71. This action rotates the resetting shaft 29 in a reverse direction, independently of the gear 28 which action is permitted by the frictional drive connection between said gear and said shaft, and consequently returns the crank 43 to its initial position. The latch plate will remain in engagement with the stop 71 during half the predetermined time interval, and will be released, as above explained, and will fly around into engagement with the stop 70 where it will remain until the expiration of such time interval. This cycle of operations will continue as long as the motor 51 is in operation. The detention of the latch plate by the stop 71 does not interfere with the movement of the arm 82 correlatively with the registering mechanism of the meter, because, as above explained, as soon as the pawl 74 clears the wedge plate 80 it springs away from the tooth 81 leaving the arm 82 free to move in the opposite direction.

From the foregoing description it will be understood that the watt-hour meter, which includes the armature 18 and armature shaft 19, when current is being consumed constantly drives the gear 28 and also, through pinion 23, drives the clockwork which controls the operation of the indicators 16 shown in Fig. 1; also that when said meter is in operation it rotates the shaft 42 in a clockwise direction as seen in Fig. 2, thereby, through the crank 43, moving the indicator 46, also in a clockwise direction, unless the current consumption during any time interval happens to be less than the greatest current consumption during any preceding time interval, in which case the crank 43 would not be moved far enough during the last time interval to engage and actuate the arm 44. In the latter case the indicator 46 would not be advanced. The motor 51, being continuously in operation at a constant speed, drives shaft 30 and eccentric 63, so that at regular intervals the latch plate 66 is released so that the resetting mechanism operates to restore the crank 43 to its initial position instantaneously and without affecting the operation of the watt-hour meter. The rotation of the shaft 30 by the constant speed motor rewinds the spring 69, which constitutes a power deviced by which the latch plate 66 is rotated in the resetting operation, so that said latch plate is always ready to function in the manner hereinbefore described.

It will be understood that while I prefer to use a constant speed electric motor for actuating the resetting mechanism, any other suitable means, such as a clock, could be used for that purpose, and the claims hereinafter made are to be construed accordingly.

What I claim as my invention and desire to secure by Letters Patent, is—

1. In a maximum demand meter of the type having a maximum demand indicator and an actuating member therefor correlated with the meter and adapted to be reset independently thereof, the combination with said actuating member of friction drive mechanism actuated by the meter for moving said actuating member in a forward direction, and periodically actuated power operated means connected for transmitting a power drive to said member for moving the latter substantially instantaneously in the opposite direction independently of the meter.

2. In a maximum demand meter of the type having a maximum demand indicator and an actuating member therefore correlated with the meter and adapted to be reset independently thereof, the combination with said actuating member of friction drive mechanism through which all of the torque necessary for moving said actuating member in a forward direction is transmitted from said meter, and periodically actuated power operated rotating means for transmitting a power drive to said member for moving the latter substantially instantaneously in the opposite direction independently of the meter.

3. In a maximum demand meter of the type having a maximum demand indicator and an actuating member therefor correlated with the meter and adapted to be reset independently thereof, the combination with said actuating member of means for driving the same in a forward direction comprising a gear rotated in a constant direction by the meter, friction slippage means normally acting to drive said actuating member from said gear but arranged to permit reverse movement thereof independently of said gear, and periodically actuated power operated means for transmitting a power drive to said actuating member for moving the latter substantially instantaneously in a reverse direction.

4. In a maximum demand meter of the type having a maximum demand indicator and an actuating member therefor correlated with the meter and adapted to be reset independently thereof, the combination with said actuating member of friction drive mechanism for driving the same in a forward direction correlatively with the meter, and means for periodically resetting said actuating member independently thereof.

5. In a maximum demand meter of the type having a maximum demand indicator and an actuating member therefor correlated with the meter and adapted to be reset independently thereof, the combination with said actuating member of friction drive mechanism for driving the same in a forward direction correlatively with the meter, a constant speed motor, and mechanism actuated by said motor for periodically resetting said actuating member independently of the meter.

6. In a maximum demand meter of the type having a maximum demand indicator and an actuating member therefor correlated with the meter and adapted to be reset independently thereof, the combination with said actuating member of friction drive mechanism for driving the same in a forward direction correlatively with the meter, a constant speed motor, and mechanism actuated by said motor for periodically resetting said actuating member independently of the operation of the meter, comprising a spring wound by said motor, resetting devices actuated by said spring to reset said actuating member, and means operated by said motor for controlling the operation of said resetting devices.

7. In a maximum demand meter of the type having a maximum demand indicator and an actuating member therefor correlated with the meter and adapted to be reset independently thereof, the combination with said actuating member of means actuated by the meter for moving the same in a forward direction, a constant speed motor, and mechanism actuated by said motor for periodically resetting said actuating member independently of the operation of the meter, comprising a spring wound by said motor, resetting devices actuated by said spring to reset said actuating member, and means operated by said motor for controlling the operation of said resetting devices.

8. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft, a gear mounted on said shaft and geared to the registering mechanism of the meter, means operatively connecting said shaft with said actuating member, and friction means interposed between said gear and said actuating member whereby said actuating member may be reset independently of said gear, and periodically actuated means for resetting said actuating member.

9. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft, a gear rotatably mounted on said shaft and geared to the registering mechanism of the meter, and a friction member rotating with said shaft and connected frictionally with said gear, and means for periodically rotating said shaft reversely relatively to the direction of rotation of said gear.

10. In a maximum demand meter of the type having a maximum demand indicator and an actuating member therefor correlated with the meter and adapted to be reset independently thereof, a resetting device comprising an arm non-rotatably connected with said actuating member, a friction drive connection for rotating said arm in a forward direction correlatively with the meter, and means for periodically returning said arm to its initial position.

11. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft, a gear rotatably mounted on said shaft and geared to the registering mechanism of the meter, means operatively connecting said shaft with said actuating member, and a resetting arm mounted on and rotating with said shaft and frictionally engaging said gear, and means for periodically engaging and actuating said resetting arm to rotate said shaft independently of said gear.

12. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft, a gear rotatably mounted on said shaft and geared to the registering mechanism of the meter, means operatively connecting said shaft with said actuating member, a resetting arm mounted on and rotating with said shaft, a friction disc rotating with said shaft and engaging said gear, and a spring for holding said gear in engagement with said friction disc, and means for periodically actuating said resetting arm to rotate said shaft independently of said gear.

13. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft, a gear rotatably mounted on said shaft and geared to the registering mechanism of the meter, and means operatively connecting said gear with said shaft and permitting reverse rotation of said shaft independently of said gear, and resetting means comprising a resetting arm carried by and rotating with said shaft, an intermittently rotating pawl movable into and out of engagement with said resetting arm, means for actuating said pawl at uniform time intervals, and means for holding said pawl in engagement with said resetting arm during the operating stroke thereof.

14. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft, a gear rotatably mounted on said shaft and geared to the registering mechanism of the meter, and means operatively connecting said gear with said shaft and permitting reverse rotation of said shaft independently of said gear, and resetting means comprising a resetting arm carried by and rotating with said shaft, a rotary resetting pawl normally out of engagement with said arm and movable into engagement therewith, means for rotating said pawl intermittently at uniform time intervals to actuate said resetting arm, and means for moving said pawl into engagement with said arm during the resetting stroke thereof.

15. In a maximum demand meter of the type having a maximum demand indicator and an actuating member therefor correlated with the meter and adapted to be reset independently thereof, a resetting device comprising a rotary resetting arm actuated in one direction by the registering mechanism of the meter and adapted to be returned to its initial position independently thereof, a rotary pawl movable into and out of position to engage said resetting arm, means for causing said pawl to rotate intermittently through half cycles at uniform time intervals, and means for causing said pawl to engage said resetting arm during alternate strokes thereof.

16. In a maximum demand meter of the type having a maximum demand indicator and an actuating member therefor correlated with the meter and adapted to be reset independently thereof, a resetting device comprising a rotary resetting arm actuated in one direction by the registering mechanism of the meter and adapted to be returned to its initial position independently thereof, a rotary pawl normally out of position to engage said resetting arm and movable into position to engage the same, means for causing said pawl to rotate intermittently through half cycles at uniform time intervals, and means for moving said pawl into position to engage said resetting arm during alternate strokes thereof.

17. In a maximum demand meter of the type having a maximum demand indicator and an actuating member therefor correlated with the meter and adapted to be reset independently thereof, a resetting device comprising a rotary resetting arm actuated in one direction by the registering mechanism of the meter and adapted to be returned to its initial position independently thereof, a rotary latch plate, stops at opposite sides of the axis of said latch plate and adapted to be engaged alternately thereby, a rotary eccentric for moving said latch plate into position to engage one or the other of said stops, constant speed means for rotating said eccentric, a spring for rotating said latch plate relatively to said eccentric, a pawl carried by and rotating with said latch plate, said pawl being movable into position to engage said resetting arm and being normally out of position to engage the same, and means for moving said pawl into position to engage said resetting arm during alternate half rotations of said latch plate.

18. In a maximum demand meter of the type having a maximum demand indicator and an actuating member therefor correlated with the meter and adapted to be reset independently thereof, a resetting device comprising a rotary resetting arm actuated in one direction by the registering mechanism of the meter and adapted to be returned to its initial position independently thereof, a rotary latch plate, stops at opposite sides of the axis of said latch plate and adapted to be engaged alternately thereby, a rotary eccentric for moving said latch plate into position to engage one or the other of said stops, constant speed means for rotating said eccentric, a spring for rotating said latch plate relatively to said eccentric, a pawl carried by and rotating with said latch plate, said pawl being movable into position to engage said resetting arm and being normally out of position to engage the same, and a segmental wedge plate for moving said pawl into engagement with said resetting arm during alternate half rotations of said latch plate.

19. In a maximum demand meter of the type having a maximum demand indicator and an actuating member therefor correlated with the meter and adapted to be reset independently thereof, a resetting device comprising a rotary resetting arm actuated in one direction by the registering mechanism of the meter and adapted to be returned to its initial position independently thereof, a rotary latch plate, stops at opposite sides of the axis of said latch plate and adapted to be engaged alternately thereby, a rotary eccentric for moving said latch plate into position to engage one or the other of said stops, constant speed means for rotating said eccentric, a spring for rotating said latch plate relatively to said eccentric, a pawl carried by and rotating with said latch plate, said pawl being movable away from said latch plate into position to engage said resetting arm, a spring for normally holding said pawl out of its operative position, and means for moving said pawl into position to engage said resetting arm during alternate half rotations of said latch plate.

20. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft adapted to be driven by the registering mechanism of the meter and to be rotated in a reverse direction independently thereof, and a resetting arm carried by and rotating with said shaft, and resetting mechanism comprising a second shaft co-axial with said first-mentioned shaft and rotatable independently thereof, a constant speed motor for rotating said second shaft in a constant direction, an eccentric carried by and rotating with said second shaft, a latch plate rotatably mounted on said eccentric, stops at opposite sides of the axis of said shaft for intermittently arresting rotation of said latch plate, a spring connected with said latch plate and with said second shaft for rotating said latch plate independently of said shaft, a pawl rotating with said latch plate and movable into and out of position to engage said resetting arm, and means for moving said pawl into position to engage said resetting arm during alternate half rotations of said latch plate.

21. In a maximum demand meter of the type having a maximum demand indicator and an actuating member therefor correlated with the meter and adapted to be reset independently thereof, the combination with said actuating member of means for driving the same in a forward direction correlatively with the meter comprising a shaft adapted to be driven by the registering mechanism of the meter and to be rotated in a reverse direction independently thereof, and a resetting arm carried by and rotating with said shaft, and resetting mechanism comprising a second shaft co-axial with said first-mentioned shaft and rotatable independently thereof, a constant speed motor for rotating said second shaft in a constant direction, an eccentric carried by and rotating with said second shaft, a latch plate rotatably mounted on said eccentric, stops at opposite sides of the axis of said shaft for alternately arresting rotation of said latch plate, a spring connected with said latch plate and with said second shaft for rotating said latch plate independently of said shaft, a pawl rotating with said latch plate and movable into and out of position to engage said resetting arm, and a segmental wedge plate for moving said pawl into position to engage said resetting arm during alternate half rotations of said latch plate.

FREDERICK C. HOLTZ.